(12) United States Patent
Nakatsuji et al.

(10) Patent No.: US 8,673,809 B2
(45) Date of Patent: Mar. 18, 2014

(54) LOW LEVEL NOBLE METAL-SUPPORTING THREE-WAY CATALYST

(75) Inventors: Tadao Nakatsuji, Kashiba (JP); Kazuya Inada, Imabari (JP); Yuji Isogai, Wako (JP); Kiyoshi Tanaami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 247 days.

(21) Appl. No.: 13/050,702

(22) Filed: Mar. 17, 2011

(65) Prior Publication Data

US 2011/0287928 A1    Nov. 24, 2011

(30) Foreign Application Priority Data

Aug. 5, 2009   (JP) ................................ 2009-182294

(51) Int. Cl.
*B01J 23/00*   (2006.01)
*B01J 21/00*   (2006.01)

(52) U.S. Cl.
USPC ........... 502/327; 502/302; 502/303; 502/304; 502/326; 502/333; 502/334; 502/339; 502/349; 502/350; 502/355; 502/415; 502/439; 502/527.12; 502/527.13

(58) Field of Classification Search
USPC ......... 502/302–304, 326, 327, 333, 334, 339, 502/349, 350, 355, 415, 439, 527.12, 502/527.13
See application file for complete search history.

(56) References Cited

U.S. PATENT DOCUMENTS

| | | | |
|---|---|---|---|
| 5,015,617 A * | 5/1991 | Ohata et al. ................ 502/304 |
| 6,540,968 B1 | 4/2003 | Huang et al. |
| 6,569,392 B1 | 5/2003 | Li et al. |
| 6,946,114 B2 * | 9/2005 | Allison et al. ................ 423/651 |
| 7,622,096 B2 * | 11/2009 | Deeba et al. ................ 423/213.2 |
| 7,879,755 B2 * | 2/2011 | Wassermann et al. ........ 502/304 |
| 7,922,988 B2 * | 4/2011 | Deeba et al. ................ 423/213.2 |
| 8,038,951 B2 * | 10/2011 | Wassermann et al. ........ 422/168 |
| 2005/0112047 A1 * | 5/2005 | Allison et al. .............. 423/418.2 |
| 2007/0111884 A1 * | 5/2007 | Chen et al. .................... 502/303 |
| 2008/0219906 A1 * | 9/2008 | Chen et al. ................. 423/213.5 |
| 2009/0041645 A1 * | 2/2009 | Wassermann et al. ..... 423/213.5 |

FOREIGN PATENT DOCUMENTS

| | | |
|---|---|---|
| JP | 2000-325792 | 11/2000 |
| JP | 2001-232200 | 8/2001 |
| JP | 2010-058110 | 3/2010 |

* cited by examiner

*Primary Examiner* — Cam N. Nguyen
(74) *Attorney, Agent, or Firm* — Hamre, Schumann, Mueller & Larson, P.C.

(57) ABSTRACT

The invention provides a catalyst for catalytically removing three components, which are carbon monoxide, hydrocarbons and nitrogen oxides, from combustion exhaust gas generated by combusting fuel at around the stoichiometric air to fuel ratio. The catalyst includes:

(A) a first catalyst component including at least rhodium, platinum, or palladium in a content of 0.01 to 0.5% by weight; and (B) a second catalyst component, which is the remainder, including a composite oxide or a mixed oxide including (a) at least zirconium oxide or titanium oxide, and (b) an oxide of at least praseodymium, yttrium, neodymium, tungsten, niobium, silicon, or aluminum, wherein the content of the oxide (a) in the composite oxide or the mixed oxide is in a range of 70 to 95% by weight. The invention further provides a two-layer catalyst that includes a surface catalyst layer containing the above-mentioned catalyst.

16 Claims, No Drawings

LOW LEVEL NOBLE METAL-SUPPORTING THREE-WAY CATALYST

FIELD OF THE INVENTION

The present invention relates to a three-way catalyst for catalytically removing three components, that is, carbon monoxide, hydrocarbons, and nitrogen oxides from combustion exhaust gas generated by combusting fuel in the neighborhood of the stoichiometric air to fuel ratio by bringing the exhaust gas into contact therewith.

More particularly, the invention relates to a three-way catalyst for catalytically removing the three components, that is, carbon monoxide, hydrocarbons, and nitrogen oxides from combustion exhaust gas generated by combusting fuel in the neighborhood of the stoichiometric air to fuel ratio by bringing the exhaust gas into contact therewith, the catalyst having remarkably decreased amounts of noble metals contained therein compared with those in conventional three-way catalysts, and yet having an excellent function for removing the three components described above in a wide temperature window, preferably from a low temperature region.

Such a catalyst is suitable for use, for example, for decreasing and removing harmful carbon monoxide, hydrocarbons, and nitrogen oxides contained in exhaust gas from engines of mobile sources such as automobiles.

BACKGROUND ART

Recently, the automobile exhaust emission regulation has become increasingly stringent, and in the context of such a circumstance, three-way catalysts are required to have further higher three-way purification functions, in order to meet the stringent exhaust emission regulation. This issue has hitherto been handled by supporting a large amount of noble metals on a carrier such as alumina in three-way catalysts. However, it is apparently a major cause of remarkable increase of a price of the three-way catalyst to support large amounts of noble metals. In addition, recently, prices of noble metals have been escalated worldwide; as a result, prices of three-way catalysts are increasing more and more, and accordingly it is urgently required to lower the prices of three-way catalysts.

Some catalysts whose contents of noble metals are decreased but whose three-way function is maintained as much as possible have already been proposed. For example, a three-way catalyst structure obtained by coating a substrate with a mixture of alumina and a rare earth oxide to form a layer of the mixture, and supporting rhodium and at least one noble metal selected from platinum and palladium on the layer of the mixture in an amount of about 0.7 to 5% by weight of the substrate is proposed (JP 2000-325792 A).

Also, a three-way catalyst structure obtained by mixing alumina powder with calcined particles of ceria/zirconia loaded with noble metals in predetermined contents, and supporting the mixture on a substrate, wherein each of the contents of platinum, palladium, and rhodium is from about 0.1 to 2% by weight, and the total content of the noble metals is from about 0.2 to 4% by weight is also proposed (JP 2001-232200 A).

Although the amounts of the noble metals contained in these catalysts are decreased compared with those in conventional three-way catalysts, it is required to further decrease the amounts of the noble metals.

Under such a circumstance, it is strongly required to develop a catalyst for catalytically removing carbon monoxide, hydrocarbons, and nitrogen oxides from combustion exhaust gas generated by combusting fuel near at the stoichiometric air to fuel ratio by bringing the exhaust gas into contact therewith, the catalyst having remarkably decreased amounts of noble metals compared with those in conventional three-way catalysts, being able to meet the stringent exhaust emission regulation, and having an excellent three-way purification function from a low temperature region.

SUMMARY OF THE INVENTION

It is an object of the invention to provide a three-way catalyst having remarkably decreased amounts of noble metals contained therein compared with those in conventional three-way catalysts, and yet which can meet stringent exhaust emission regulation and has an excellent three-way purification function from a low temperature region.

According to the invention, as a first invention is provided a catalyst for catalytically removing three components which are carbon monoxide, hydrocarbons and nitrogen oxides from combustion exhaust gas generated by combusting fuel in the neighborhood of the stoichiometric air to fuel ratio by bringing the combustion exhaust gas into contact therewith, the catalyst comprising:

(A) a first catalyst component comprising at least one member selected from rhodium, platinum, and palladium in a content of 0.01 to 0.5% by weight; and (B) a second catalyst component, which is the remainder, comprising a composite oxide or a mixed oxide comprising (a) at least one oxide selected from zirconium oxide and titanium oxide, and (b) an oxide of at least one element selected from praseodymium, yttrium, neodymium, tungsten, niobium, silicon, and aluminum, wherein the content of the oxide (a) in the composite oxide or the mixed oxide is in a range of 70 to 95% by weight.

This catalyst is hereinafter referred to as a first catalyst of the invention.

In particular, according to the invention, it is preferable that, in the first catalyst, the second catalyst component comprises a composite oxide comprising zirconium oxide and praseodymium oxide, and the content of the zirconium oxide in the composite oxide is in a range of 85 to 95% by weight.

Further in the first catalyst of the invention, the first catalyst component preferably comprises either rhodium, or a combination of platinum and palladium. When the first catalyst component comprises a combination of platinum and palladium, the weight ratio of platinum/palladium is preferably within a range of 1/3 to 3/1, more preferably within a range of 1/2 to 2/1, and most preferably within a range of 2/3 to 3/2. Preferably, the first catalyst component is supported on the second catalyst component.

In addition, the first catalyst of the invention has one feature in that it preferably shows an ammonia desorption peak at a temperature in a range of 275 to 700° C. in an ammonia adsorption and temperature-programmed desorption test.

According to the invention, as a second invention is provided a two-layer catalyst for catalytically removing three components which are carbon monoxide, hydrocarbons, and nitrogen oxides from combustion exhaust gas generated by combusting fuel in the neighborhood of the stoichiometric air to fuel ratio by bringing the combustion exhaust gas into contact therewith, the catalyst comprising a surface catalyst layer and an inner catalyst layer, wherein the surface catalyst layer comprises:

(A) a first catalyst component comprising at lease one member selected from rhodium, platinum, and palladium in a content of 0.01 to 0.5% by weight; and (B) a second catalyst component, which is the remainder, comprising a composite oxide or a mixed oxide comprising (a) at least one oxide selected from zirconium oxide and titanium oxide, and (b) an oxide of at least one element selected from praseodymium, yttrium, neodymium, tungsten, niobium, silicon, and aluminum, wherein the content of the oxide (a) in the composite oxide or the mixed oxide is in a range of 70 to 95% by weight;

and wherein the inner catalyst layer comprises:

(A) a first catalyst component comprising at least one member selected from rhodium, platinum, and palladium in a content of 0.01 to 0.5% by weight, and (B) a second catalyst component, which is the remainder, comprising (a) ceria, or a composite oxide or a mixed oxide comprising (b) ceria and (c) an oxide of at least one element selected from zirconium, lanthanum, praseodymium, neodymium, and yttrium, wherein the content of the oxide (b) in the composite oxide or mixed oxide is in a range of 50 to 95% by weight.

This catalyst is hereinafter referred to as a second catalyst of the invention.

Thus, the second catalyst of the invention is a two-layer catalyst which comprises the surface catalyst layer which is comprised of the above-mentioned first catalyst of the invention and the second catalyst layer combined therewith.

In such a second catalyst of the invention, the first catalyst component in the inner catalyst layer preferably comprises palladium, or a combination of palladium and at least one member selected from platinum and rhodium, most preferably palladium, a combination of palladium and platinum, or a combination of palladium and rhodium.

In addition, the first catalyst component of the surface catalyst layer of the second catalyst of the invention is preferably supported on the second catalyst component.

EFFECT OF THE INVENTION

Although the first catalyst of the invention comprises a noble metal component, which is the first catalyst component, in a very low content of 0.01 to 0.5% by weight, it can catalytically purify combustion exhaust gas containing the three components, that is, carbon monoxide, hydrocarbons, and nitrogen oxides, generated by combusting fuel in the neighborhood of the stoichiometric air to fuel ratio in a wide temperature window, preferably from a lower temperature region, with a high efficiency.

In particular, according to the first catalyst of the invention, when the first catalyst component comprises platinum and palladium, and when the weight ratio of platinum/palladium is in a range of preferably 1/3 to 3/1, more preferably 1/2 to 2/1, most preferably 2/3 to 3/2, combustion exhaust gas containing the three components, carbon monoxide, hydrocarbons, and nitrogen oxides can be catalytically purified in a wide temperature window from a low temperature region with a high efficiency, without using very expensive rhodium.

In addition, because the first catalyst of the invention shows an ammonia desorption peak at a temperature in a range of 275 to 700° C. in an ammonia adsorption and temperature-programmed desorption test, a strong solid acid exists in the catalyst, and therefore the catalyst can lower combustion temperatures of hydrocarbons.

The second catalyst of the invention, that is, the two-layer catalyst, has the surface catalyst layer comprising the first catalyst described above, and the inner catalyst layer comprising the first catalyst component comprising the noble metal component and the second catalyst component comprising such an oxide as ceria. When combustion exhaust gas containing the three components, carbon monoxide, hydrocarbons, and nitrogen oxides is brought into contact with the second catalyst of the invention, the second catalyst component in the inner catalyst layer functions as a supply source of active surface oxygen to the first catalyst component comprised of the noble metal catalyst, and the active surface oxygen promotes combustion of the hydrocarbons on the catalyst. Thus, the combustion temperatures of the hydrocarbons can be further lowered.

EMBODIMENTS OF THE INVENTION

In the invention, the neighborhood of the stoichiometric air to fuel ratio generally refers to the stoichiometric weight ratio of air/fuel (about 14.5)±(the stoichiometric weight ratio of air/fuel)×10%, when the fuel is gasoline. Therefore, the neighborhood of the stoichiometric air to fuel ratio is defined to be a weight ratio of air/fuel within a range of 13.0 to 16.0, preferably 14.0 to 15.0 in the invention.

The first catalyst of the invention is a catalyst for catalytically removing three components which are carbon monoxide, hydrocarbons and nitrogen oxides from combustion exhaust gas generated by combusting fuel in the neighborhood of the stoichiometric air to fuel ratio by bringing the combustion exhaust gas into contact therewith, the catalyst comprising:

(A) a first catalyst component comprising at least one member selected from rhodium, platinum, and palladium in a content of 0.01 to 0.5% by weight; and (B) a second catalyst component, which is the remainder, comprising a composite oxide or a mixed oxide comprising (a) at least one oxide selected from zirconium oxide and titanium oxide, and (b) an oxide of at least one element selected from praseodymium, yttrium, neodymium, tungsten, niobium, silicon, and aluminum, wherein the content of the oxide (a) in the composite oxide or the mixed oxide is in a range of 70 to 95% by weight.

In the first catalyst of the invention, it is preferable that the first catalyst component comprising at least one selected from rhodium, platinum, and palladium is supported on the second catalyst component, which is the composite oxide or mixed oxide. Here, although the content of the first catalyst component in the first catalyst of the invention is as small as 0.01 to 0.5% by weight, when the first catalyst is brought into contact with combustion exhaust gas containing the three components, carbon monoxide, hydrocarbons, and nitrogen oxides, which is generated by combusting fuel in the neighborhood of the stoichiometric air to fuel ratio, the three components described above can be catalytically removed in a wide temperature window with a high efficiency.

In particular, according to the first catalyst of the invention, when the first catalyst component comprises a combination of platinum and palladium, and when the weight ratio of platinum/palladium is in a range of preferably 1/3 to 3/1, more preferably 1/2 to 2/1, most preferably 2/3 to 3/2, combustion exhaust gas containing the three components, carbon monoxide, hydrocarbons, and nitrogen oxides can be catalytically purified in a wide temperature window with a high efficiency, without using very expensive rhodium.

In the first catalyst of the invention, when the content of the first catalyst component or the noble metal component is less than 0.01% by weight, the catalyst effect cannot effectively work. On the other hand, when the content is more than 0.5% by weight, the purification rate cannot be improved any more. The first catalyst of the invention preferably comprises the first catalyst component in a content of 0.05 to 0.3% by weight.

The first catalyst of the invention comprises the first catalyst component and the second catalyst component which is the remainder, and accordingly the content of the second catalyst component in the first catalyst of the invention is in a range of 99.5 to 99.99% by weight, preferably in a range of 99.7 to 99.95% by weight.

The second catalyst component in the first catalyst of the invention is, as described above, the composite oxide (that is, a solid solution) or the mixed oxide comprising (a) at least one oxide selected from zirconium oxide and titanium oxide; and (b) an oxide of at least one element selected from praseodymium, yttrium, neodymium, tungsten, niobium, silicon, and aluminum, wherein the content of the oxide (a) in the composite oxide or the mixed oxide is in a range of 70 to 95% by weight, preferably in a range of 80 to 95% by weight. The composite oxide is preferable to the mixed oxide.

Preferable examples of the composite oxide comprising (a) at least one oxide selected from zirconium oxide and titanium oxide and (b) the oxide of at least one element selected from praseodymium, yttrium, neodymium, tungsten, niobium, silicon, and aluminum, may include, as a binary composite oxide, zirconium/praseodymium composite oxide, zirconium/neodymium composite oxide, zirconium/tungsten composite oxide, zirconium/aluminum composite oxide, zirconium/silicon composite oxide, zirconium/niobium composite oxide, titanium/silicon composite oxide, and the like. The weight ratio of the elements in the composite oxide is preferably within a range of 95/5 to 80/20 in terms of the oxide.

In turn, examples of ternary composite oxides may include zirconium/silicon/tungsten composite oxide, zirconium/neodymium/aluminum composite oxide, zirconium/yttrium/tungsten composite oxide, and the like. The weight ratio of the elements in the composite oxide is preferably within a range of 90/5/5 to 80/10/10 in terms of the oxide.

In the invention, the weight ratios of the elements in the composite oxide in terms of the oxide are calculated by identifying zirconium oxide, titanium oxide, praseodymium oxide, neodymium oxide, aluminum oxide, yttrium oxide, silicon oxide, niobium oxide, and tungsten oxide as, respectively, $ZrO_2$, $TiO_2$, $Pr_6O_{11}$, $Nd_2O_3$, $Al_2O_3$, $Y_2O_3$, $SiO_2$, $Nb_2O_5$, and $WO_3$.

In particular, in the first catalyst of the invention, as the second catalyst component, zirconium/praseodymium composite oxide, zirconium/neodymium composite oxide, zirconium/tungsten composite oxide, zirconium/aluminum composite oxide, zirconium/niobium composite oxide, zirconium/silicon/yttrium/tungsten composite oxide, and titanium/silicon composite oxide are preferably used.

Of these, according to the invention, it is preferable that the second catalyst component in the first catalyst is a composite oxide comprised of zirconium oxide and praseodymium oxide having a content of the zirconium oxide preferably in a range of 85 to 95% by weight in the composite oxide, and most preferably in a range of 87.5 to 92.5% by weight.

The first catalyst of the invention may be prepared, for example, as follows.

First, an aqueous solution containing a water-soluble salt of an element forming the second catalyst component, such as an aqueous solution of a nitrate, is neutralized or thermally hydrolyzed to form a hydroxide, and then the obtained hydroxide is calcined at a temperature of 300 to 900° C. in an oxidizing or reducing atmosphere, thereby the second catalyst component is obtained as powder.

Next, a water-soluble salt, such as a nitrate or a complex salt, of a noble metal which is the first catalyst component is supported on the second catalyst component by an ion-exchange method, and then, the resulting product is calcined at a temperature of 500 to 900° C. in an oxidizing or reducing atmosphere, thereby the first catalyst of the invention in which the first catalyst component is supported on the second catalyst component can be obtained as powder.

According to the invention, it is preferable that the first catalyst of the invention has an ammonia desorption peak at a temperature in a range of 275 to 700° C. in an ammonia adsorption and temperature-programmed desorption test. Hydrocarbons are made to be combusted at low temperatures not by a weakly acidic site where adsorbed ammonia desorbs at a temperature range of 200 to 250° C. (it can be considered to be a Lewis acid), but by a strongly acidic site where adsorbed ammonia desorbs at a temperature range of 275 to 700° C. (it can be considered to be a Brønsted acid); as a result, an oxygen concentration in exhaust gas is decreased, and reducibility at low temperatures of $NO_x$ is promoted. The reason why the Brønsted acid promotes the combustion, that is, oxidation reaction, of the hydrocarbons is assumed that the Brønsted acid gives protons to a double bond in an unsaturated hydrocarbon such as propylene to generate carbonium ions on the hydrocarbon, and the carbonium ions easily react with oxygen having strong electrophilicity, and thus, the oxidation reaction is promoted.

The second catalyst of the invention is a two-layer catalyst for catalytically removing three components which are carbon monoxide, hydrocarbons, and nitrogen oxides from combustion exhaust gas generated by combusting fuel in the neighborhood of the stoichiometric air to fuel ratio by bringing the combustion exhaust gas into contact therewith, the catalyst comprising a surface catalyst layer and an inner catalyst layer, wherein the surface catalyst layer comprises:

(A) a first catalyst component comprising at lease one member selected from rhodium, platinum, and palladium in a content of 0.01 to 0.5% by weight; and (B) a second catalyst component, which is the remainder, comprising a composite oxide or a mixed oxide comprising (a) at least one oxide selected from zirconium oxide and titanium oxide, and (b) an oxide of at least one element selected from praseodymium, yttrium, neodymium, tungsten, niobium, silicon, and aluminum, wherein the content of the oxide (a) in the composite oxide or the mixed oxide is in a range of 70 to 95% by weight;

and wherein the inner catalyst layer comprises:

(A) a first catalyst component comprising at least one member selected from rhodium, platinum, and palladium in a content of 0.01 to 0.5% by weight, and (B) a second catalyst component, which is the remainder, comprising (a) ceria, or a composite oxide or a mixed oxide comprising (b) ceria and (c) an oxide of at least one element selected from zirconium, lanthanum, praseodymium, neodymium, and yttrium, wherein the content of the oxide (b) in the composite oxide or mixed oxide is in a range of 50 to 95% by weight.

That is, the second catalyst of the invention is a catalyst having a two-layer structure wherein the surface catalyst layer is the first catalyst of the invention as described above, and the inner catalyst layer combined with the surface catalyst layer.

In the second catalyst of the invention, the first catalyst component of the inner catalyst layer also comprises at least one selected from rhodium, platinum, and palladium, and is supported on the second catalyst component, that is, the composite oxide or the mixed oxide described above. According to the invention, when the inner catalyst layer is combined with the first catalyst so as to form the surface catalyst layer, the combustion temperature of the three components, particularly the hydrocarbons is lowered, and the purification can be performed in a lower temperature region.

In the second catalyst of the invention, the first catalyst component is preferably palladium, or a combination of palladium and at least one selected from platinum and rhodium, most preferably palladium, a combination of palladium and platinum, or a combination of palladium and rhodium. According to the invention, when palladium or the combination of palladium and platinum is used as the first catalyst component, the inner catalyst layer can be formed without using very expensive rhodium.

As described above, the surface catalyst layer can also be formed without using rhodium, and thus, according to the invention, the two-layer catalyst comprised of the inner catalyst layer and the surface catalyst layer can be formed without using rhodium, and the three components described above can be removed from a lower temperature region by using such a two-layer catalyst.

That is, in the purification of exhaust gas containing the three components using the second catalyst of the invention, the second catalyst component of the inner catalyst layer functions as a supply source of active surface oxygen to the first catalyst component comprised of the noble metal, and the active surface oxygen promotes the combustion of the hydrocarbons on the catalyst, and thus the combustion temperatures of the hydrocarbons can be further lowered.

In the second catalyst of the invention, the first catalyst component, that is, the noble metal component, is also contained in a content of 0.01 to 0.5% by weight in the inner catalyst layer, so that the second catalyst can contribute to the catalytic removal of the three components. In the second catalyst of the invention, when the content of the first catalyst component, that is, the noble metal component, is less than 0.01% by weight in the inner catalyst layer, the removal effect is insufficient. On the other hand, when the content is more than 0.5% by weight, the removal rate cannot be improved any more. In the two-layer catalyst of the invention, it is preferred that the first catalyst component is also contained in a content in a range of 0.05 to 0.3% by weight in the inner catalyst layer.

In the second catalyst of the invention, the inner catalyst layer comprises the first catalyst component and the second catalyst component which is the remainder, and accordingly, the second catalyst component is contained in a content of 99.5 to 99.99% by weight, preferably 99.7 to 99.95% by weight, in the inner catalyst layer.

In the second catalyst of the invention, the second catalyst component of the inner catalyst layer comprises, as mentioned above, either (a) ceria, or a composite oxide or a mixed oxide comprising (b) ceria and (c) an oxide of at least one element selected from zirconium, lanthanum, praseodymium, neodymium, and yttrium, in which the content of the oxide (b) in the composite oxide or the mixed oxide is in a range of 50 to 95% by weight. The composite oxide is preferable to the mixed oxide.

Preferred examples of the composite oxide comprising (b) ceria and (c) an oxide of at least one element selected from zirconium, lanthanum, praseodymium, neodymium, and yttrium, may include, as a binary composite oxide, cerium/praseodymium composite oxide, cerium/zirconium composite oxide, and the like. The weight ratio of the elements in the composite oxide is preferably within a range of 95/5 to 50/50 in terms of the oxide. In turn, preferred examples of ternary composite oxides may include cerium/zirconium/-praseodymium composite oxide, cerium/zirconium/lanthanum composite oxide, and the like. The weight ratio of the elements in the composite oxide is preferably within a range of 20/75/5 to 65/10/25 in terms of the oxide. In the invention, the weight ratios of the elements in the composite oxide in terms of the oxide are, as described above, calculated by identifying ceria, zirconium oxide, praseodymium oxide, neodymium oxide, and yttrium oxide as, respectively, $CeO_2$, $ZrO_2$, $La_2O_3$, $Pr_6O_{11}$, $Nd_2O_3$, and $Y_2O_3$.

The catalyst for the inner catalyst layer of the second catalyst of the invention may be prepared in the same manner as the preparation of the first catalyst, for example, as follows.

First, an aqueous solution containing a water-soluble salt, such as a nitrate, of an element forming the second catalyst component (B) is neutralized or thermally hydrolyzed to form a hydroxide, and then the obtained hydroxide is calcined at a temperature of 300 to 900° C. in an oxidizing or reducing atmosphere, thereby the second catalyst component is obtained as powder.

Next, a water-soluble salt, such as a nitrate or a complex salt, of a noble metal which is the first catalyst component (A) is supported on the second catalyst component by an ion-exchange method, and then, the resulting product is calcined at a temperature of 500 to 900° C. in an oxidizing or reducing atmosphere, thereby a catalyst in which the first catalyst component is supported on the second catalyst component can be obtained as powder.

In particular, as the second catalyst component in the inner catalyst layer of the second catalyst of the invention, either ceria, or a composite oxide of ceria and an oxide of at least one element selected from zirconium, lanthanum, and praseodymium, and cerium, such as cerium/praseodymium composite oxide, cerium/zirconium/-praseodymium composite oxide, and cerium/zirconium/lanthanum composite oxide is preferably used.

In order to catalytically remove the three components, carbon monoxide, hydrocarbons, and nitrogen oxides from exhaust gas by bringing the exhaust gas into contact with any of the first and second catalysts of the invention, it is preferable to combust fuel in the neighborhood of the stoichiometric air to fuel ratio. For example, it is desirable that fuel is supplied to a combustion room of an engine and combusted so that exhaust gas contains 0.2 to 0.75% of carbon monoxide, 0.1 to 0.5% of hydrogen, 0.02 to 0.1% (in terms of C1) of hydrocarbons, and 0.25 to 0.75% of oxygen.

A temperature at which exhaust gas is brought into contact with the catalyst, that is, a reaction temperature, is usually 100° C. or higher, preferably 200° C. or higher, though it depends on the composition of the exhaust gas. The upper limit of the reaction temperature is not particularly limited, and is usually 1000° C. Exhaust gas may be treated preferably at a space velocity of, 20000 to 150000 $h^{-1}$ within the reaction temperature range mentioned above.

Both the first catalyst component and the second catalyst component of any of the first and second catalysts of the invention may be obtained in various forms, for example, in the form of a powder or a particulate. Accordingly, any of the catalysts may be formed into a catalyst structure having various forms, for example, a honeycomb structure, a ring structure, or a sphere structure, by using any conventionally well-known method. In addition, when such a catalyst structure is manufactured, an appropriate additive such as a molding aid, a reinforcing agent, an inorganic fiber, and an organic binder may be used, as occasion demands.

According to the invention, it is advantageous that the catalyst is used as a catalyst structure having the catalyst layer produced by making the catalyst and a binder component into slurry, and coating a surface of an inactive substrate having any shape with the slurry by, for example, a wash coating method.

Thus, it is advantageous that the first catalyst of the invention is used in the form of a monolayer catalyst structure obtained by coating a surface of a substrate with the catalyst; it is advantageous that the second catalyst of the invention is used in the form of a two-layer catalyst structure obtained by coating a surface of a substrate with the catalyst for the inner catalyst layer in the same manner as above to form an inner catalyst layer, and subsequently coating a surface of the inner catalyst layer on the substrate with the catalyst for the surface catalyst layer to form a surface catalyst layer.

A thickness of the catalyst layer to be formed on a substrate, that is, an amount of the catalyst coated on a substrate is usually within a range of 25 to 150 g per liter of the honeycomb substrate, particularly preferably 50 to 100 g in a case of the monolayer catalyst, though it depends on the reaction conditions such as a temperature at which exhaust gas is brought into contact with the catalyst layer, an oxygen concentration in exhaust gas, or a space velocity (SV) at which exhaust gas is brought into contact with the catalyst layer.

In a case of the two-layer catalyst, an amount of coating of the surface catalyst layer is usually within a range of 25 to 150 g per liter of the honeycomb substrate, preferably 50 to 100 g. When the amount of coating of the surface catalyst layer is more than 150 g per liter of the honeycomb substrate, the obtained inner catalyst layer does not effectively function; as a result, the three-way purification function of the two-layer catalyst may be lowered. On the other hand, when the amount of coating of the surface catalyst layer is less than 25 g per liter of the honeycomb substrate, the obtained surface catalyst layer insufficiently functions and, as in the case above, the three-way purification function of the two-layer catalyst may be lowered.

An amount of coating of the inner catalyst layer is within a range of 25 to 100 g per liter of the honeycomb substrate, preferably 40 to 70 g, so that the inner catalyst layer exhibits optimum functions, and the three-way purification function can be exhibited from a lower temperature region by the combination thereof with the surface catalyst layer.

The inactive substrate may be, for example, clay minerals such as cordierite, or product composed of a metal such as stainless steel, preferably a heat-resistant metal such as Fe—Cr—Al. The shape thereof may be a honeycomb substrate, a ring structure, spherical structure, or the like. Any of such catalyst structures is preferably used for removing the three components, carbon monoxide, hydrocarbons, and nitrogen oxides from exhaust gas of automobiles using a gasoline engine.

EXAMPLES

The invention will be described in more detail with reference to Examples of productions of catalyst structures, and catalytic removal of carbon monoxide, hydrocarbons, and nitrogen oxides using the catalyst structure below, but the invention is not limited thereto at all.

(I) Production of Catalyst Structure Having the First Catalyst (Monolayer Catalyst Structure) and Evaluation of Catalytic Performance
(1) Production of Catalyst Structure Example 1

19.52 g of zirconyl nitrate ($ZrO(NO_3)_3.2H_2O$) and 2.55 g of praseodymium nitrate ($Pr(NO_3)_3.6H_2O$) were dissolved in 100 mL of ion exchanged water to prepare an aqueous solution. 0.1 N ammonia water was added to the aqueous solution to neutralize and hydrolyze the zirconium salt and praseodymium salt, followed by one hour aging. The product was separated by filtration from the resulting slurry, dried at a temperature of 120° C. for 24 hours, and calcined at a temperature of 500° C. for three hours in the air, thereby 10 g of powder of zirconium/praseodymium composite oxide (having an oxide basis weight ratio of 90/10 and a specific surface area of 112 $m^2/g$) was obtained.

5 g of the powder of composite oxide was added to 20 mL of ion exchanged water to prepare a slurry. 5 g of aqueous solution of rhodium nitrate (0.1% by weight as Rh) was added to the slurry while the slurry was stirred with a magnetic stirrer. The resultant was kept at a temperature of 60° C. for one hour to support rhodium ions on the composite oxide by ion exchange. The resulting slurry was evaporated to dryness while it was stirred, followed by calcining at a temperature of 500° C. for one hour in the air, thereby a catalyst powder of zirconium/praseodymium composite oxide supporting 0.1% by weight of rhodium was obtained.

3 g of the catalyst powder, 0.6 g of alumina sol and 0.8 g of silica sol were mixed with a proper amount of water. The mixture was shaken by hand in the presence of several grams of zirconia balls as grinding media to disintegrate the aggregated mixture, thereby a slurry for wash coating was obtained. The slurry for wash coating was coated on a honeycomb formed of cordierite having a cell number of 400 per square inch, dried, and calcined at a temperature of 500° C. for one hour in the air, thereby a honeycomb catalyst structure A1 supporting 150 g of catalyst per 1 L of honeycomb substrate was obtained.

Example 2

5 g of the powder of zirconium/praseodymium composite oxide obtained in Example 1 was added to 20 mL of ion exchanged water to prepare a slurry. 5 g of aqueous solution of palladium nitrate (0.1% by weight as Pd) and 5 g of aqueous solution of dinitrodiammine-platinum (0.1% by weight as Pt) were added to the slurry while the slurry was stirred with a magnetic stirrer. The resultant was kept at a temperature of 60° C. for one hour to support palladium ions and platinum ions on the composite oxide by ion exchange. The resulting slurry was evaporated to dryness while it was stirred, followed by calcining at a temperature of 500° C. for one hour in the air, thereby a catalyst powder of zirconium/praseodymium composite oxide supporting 0.1% by weight of palladium and 0.1% by weight of platinum was obtained.

Using this catalyst powder, a honeycomb catalyst structure A2 supporting 150 g of catalyst per 1 L of honeycomb substrate was obtained in the same manner as Example 1.

Example 3

19.52 g of zirconyl nitrate ($ZrO(NO_3)_3.2H_2O$) and 2.59 g of neodymium nitrate ($Nd(NO_3)_3.6H_2O$) were dissolved in 100 mL of ion exchanged water to prepare an aqueous solution. 0.1 N ammonia water was added to the aqueous solution to neutralize and hydrolyze the zirconium salt and neodymium salt, followed by one hour aging. The product was separated by filtration from the resulting slurry, dried at a temperature of 120° C. for 24 hours, and calcined at a temperature of 500° C. for three hours in the air, thereby 10 g of powder of zirconium/neodymium composite oxide (having an oxide basis weight ratio of 90/10 and a specific surface area of 95 m$^2$/g) was obtained.

5 g of the powder of zirconium/neodymium composite oxide was used in place of 5 g of zirconium/praseodymium composite oxide, and otherwise in the same manner as Example 2, a catalyst powder of zirconium/neodymium composite oxide supporting 0.1% by weight of palladium and 0.1% by weight of platinum was obtained.

Using this catalyst powder, a honeycomb catalyst structure A3 supporting 150 g of catalyst per 1 L of honeycomb substrate was obtained in the same manner as Example 1.

Example 4

19.52 g of zirconyl nitrate (ZrO(NO$_3$)$_3$.2H$_2$O) and 7.36 g of aluminum nitrate (Al(NO$_3$)$_3$.9H$_2$O) were dissolved in 100 mL of ion exchanged water to prepare an aqueous solution. 0.1 N ammonia water was added to the aqueous solution to neutralize and hydrolyze the zirconium salt and aluminum salt, followed by one hour aging. The product was separated by filtration from the resulting slurry, dried at a temperature of 120° C. for 24 hours, and calcined at a temperature of 500° C. for three hours in the air, thereby 10 g of a powder of zirconium/aluminum composite oxide (having an oxide basis weight ratio of 90/10 and a specific surface area of 233 m$^2$/g) was obtained.

5 g of the powder of zirconium/aluminum composite oxide was used in place of 5 g of zirconium/praseodymium composite oxide, and otherwise in the same manner as Example 2, a catalyst powder of zirconium/aluminum composite oxide supporting 0.1% by weight of palladium and 0.1% by weight of platinum was obtained.

Using this catalyst powder, a honeycomb catalyst structure A4 supporting 150 g of catalyst per 1 L of honeycomb substrate was obtained in the same manner as Example 1.

Example 5

5 g of the powder of zirconium/praseodymium composite oxide obtained in Example 1 was added to 20 mL of ion exchanged water to prepare a slurry. 1 g of aqueous solution of palladium nitrate (0.1% by weight as Pd) and 4 g of aqueous solution of dinitrodiammine-platinum (0.1% by weight as Pt) were added to the slurry while the slurry was stirred with a magnetic stirrer. Otherwise in the same manner as Example 2, a catalyst powder of zirconium/praseodymium composite oxide supporting 0.025% by weight of palladium and 0.075% by weight of platinum was obtained.

Using this catalyst powder, a honeycomb catalyst structure A5 supporting 150 g of catalyst per 1 L of honeycomb substrate was obtained in the same manner as Example 1.

Example 6

5 g of the powder of zirconium/praseodymium composite oxide obtained in Example 1 was added to 20 mL of ion exchanged water to prepare a slurry. 2 g of aqueous solution of palladium nitrate (0.1% by weight as Pd) and 3 g of aqueous solution of dinitrodiammine-platinum (0.1% by weight as Pt) were added to the slurry while the slurry was stirred with a magnetic stirrer. Otherwise in the same manner as Example 2, a catalyst powder of zirconium/praseodymium composite oxide supporting 0.04% by weight of palladium and 0.06% by weight of platinum was obtained.

Using this catalyst powder, a honeycomb catalyst structure A6 supporting 150 g of catalyst per 1 L of honeycomb substrate was obtained in the same manner as Example 1.

Example 7

5 g of the powder of zirconium/praseodymium composite oxide obtained in Example 1 was added to 20 mL of ion exchanged water to prepare a slurry. 2.5 g of aqueous solution of palladium nitrate (0.1% by weight as Pd) and 2.5 g of aqueous solution of dinitro-diammineplatinum (0.1% by weight as Pt) were added to the slurry while the slurry was stirred with a magnetic stirrer. Otherwise in the same manner as Example 2, a catalyst powder of zirconium/-praseodymium composite oxide supporting 0.05% by weight of palladium and 0.05% by weight of platinum was obtained was obtained.

Using this catalyst powder, a honeycomb catalyst structure A7 supporting 150 g of catalyst per 1 L of honeycomb substrate was obtained in the same manner as Example 1.

Example 8

5 g of the powder of zirconium/praseodymium composite oxide obtained in Example 1 was added to 20 mL of ion exchanged water to prepare a slurry. 3 g of aqueous solution of palladium nitrate (0.1% by weight as Pd) and 2 g of aqueous solution of dinitrodiammine-platinum (0.1% by weight as Pt) were added to the slurry while the slurry was stirred with a magnetic stirrer. Otherwise in the same manner as Example 2, a catalyst powder of zirconium/praseodymium composite oxide supporting 0.06% by weight of palladium and 0.04% by weight of platinum was obtained.

Using this catalyst powder, a honeycomb catalyst structure A8 supporting 150 g of catalyst per 1 L of honeycomb substrate was obtained in the same manner as Example 1.

Example 9

5 g of the powder of zirconium/praseodymium composite oxide obtained in Example 1 was added to 20 mL of ion exchanged water to prepare a slurry. 4 g of aqueous solution of palladium nitrate (0.1% by weight as Pd) and 1 g of aqueous solution of dinitrodiammine-platinum (0.1% by weight as Pt) were added to the slurry while the slurry was stirred with a magnetic stirrer. Otherwise in the same manner as Example 2, a catalyst powder of zirconium/praseodymium composite oxide supporting 0.075% by weight of palladium and 0.025% by weight of platinum was obtained.

Using this catalyst powder, a honeycomb catalyst structure A9 supporting 150 g of catalyst per 1 L of honeycomb substrate was obtained in the same manner as Example 1.

Example 10

5 g of the powder of zirconium/praseodymium composite oxide obtained in Example 1 was added to 20 mL of ion exchanged water to prepare a slurry. 5 g of aqueous solution of palladium nitrate (0.1% by weight as Pd) and 5 g of aqueous solution of rhodium nitrate (0.1% by weight as Rh) were added to the slurry while the slurry was stirred with a magnetic stirrer. Otherwise in the same manner as Example 2, a catalyst powder of zirconium/praseodymium composite oxide supporting 0.1% by weight of palladium and 0.1% by weight of rhodium was obtained.

Using this catalyst powder, a honeycomb catalyst structure A10 supporting 150 g of catalyst per 1 L of honeycomb substrate was obtained in the same manner as Example 1.

Example 11

24.40 g of zirconyl nitrate ($ZrO(NO_3)_3.2H_2O$) was dissolved in 100 mL of ion exchanged water to prepare an aqueous solution. 0.1 N ammonia water was added to the aqueous solution to neutralize and hydrolyze the zirconium salt, followed by one hour aging. The product was separated by filtration from the resulting slurry, dried at a temperature of 120° C. for 24 hours, and calcined at a temperature of 500° C. for three hours in the air, thereby 10 g of powder of zirconium oxide was obtained.

10 mL of ion exchanged water and 2.22 g of aqueous solution of 50% by weight of ammonium metatungstate were added to the powder of the oxide. The resulting slurry was evaporated to dryness while it was stirred, followed by calcining at a temperature of 500° C. for three hours in the air, thereby 11 g of powder of zirconium/tungsten composite oxide (having an oxide basis weight ratio of 90/10 and a specific surface area of 93 $m^2/g$) was obtained.

5 g of the powder of the composite oxide was added to 20 mL of ion exchanged water to prepare a slurry. 5 g of aqueous solution of rhodium nitrate (0.1% by weight as Rh) was added to the slurry while the slurry was stirred with a magnetic stirrer. The resultant was kept at a temperature of 60° C. for one hour to support rhodium ions on the composite oxide by ion exchange. The resulting slurry was evaporated to dryness while it was stirred, followed by calcining at a temperature of 500° C. for one hour in the air, thereby a catalyst powder of zirconium/tungsten composite oxide supporting 0.1% by weight of rhodium was obtained.

Using this catalyst powder, a honeycomb catalyst structure A11 supporting 150 g of catalyst per 1 L of honeycomb substrate was obtained in the same manner as Example 1.

Example 12

5 g of the powder of zirconium/aluminum composite oxide obtained in Example 4 was added to 20 mL of ion exchanged water to prepare a slurry. 5 g of aqueous solution of rhodium nitrate (0.1% by weight as Rh) was added to the slurry while the slurry was stirred with a magnetic stirrer. The resultant was kept at a temperature of 60° C. for one hour to support rhodium ions on the composite oxide by ion exchange. The resulting slurry was evaporated to dryness while it was stirred, followed by calcining at a temperature of 500° C. for one hour in the air, thereby a catalyst powder of zirconium/aluminum composite oxide supporting 0.1% by weight of rhodium was obtained.

Using this catalyst powder, a honeycomb catalyst structure A12 supporting 150 g of catalyst per 1 L of honeycomb substrate was obtained in the same manner as Example 1.

Example 13

60 g of aqueous solution of titanium tetrachloride (15% by weight as titanium oxide) and 5 g of silica sol (SNOWTEX O manufactured by Nissan Kagaku K.K., 20% by weight as silica) were mixed with stirring. 0.1 N ammonia water was added to the mixture to neutralize and hydrolyze the mixture, followed by aging for one hour. The product was separated by filtration from the obtained slurry, and dried at a temperature of 120° C. for 24 hours, followed by calcining at a temperature of 500° C. for three hours in the air, thereby 10 g of a powder of titanium/silicon composite oxide (having an oxide basis weight ratio of 90/10 and a specific surface area of 186 $m^2/g$) was obtained.

5 g of the powder of the composite oxide was added to 20 mL of ion exchanged water to prepare a slurry. 5 g of aqueous solution of rhodium nitrate (0.1% by weight as Rh) was added to the slurry while the slurry was stirred with a magnetic stirrer. The resultant was kept at a temperature of 60° C. for one hour to support rhodium ions on the composite oxide by ion exchange. The resulting slurry was evaporated to dryness while it was stirred, followed by calcining at a temperature of 500° C. for one hour in the air, thereby a catalyst powder of titanium/silicon composite oxide supporting 0.1% by weight of rhodium was obtained.

Using this catalyst powder, a honeycomb catalyst structure A13 supporting 150 g of catalyst per 1 L of honeycomb substrate was obtained in the same manner as Example 1.

Example 14

17.35 g of zirconyl nitrate ($ZrO(NO_3)_3.2H_2O$) and 3.39 g of yttrium nitrate ($Y(NO_3)_3.6H_2O$) were dissolved in 100 mL of ion exchanged water to prepare an aqueous solution. 0.1 N ammonia water was added to the aqueous solution to neutralize and hydrolyze the zirconium salt and yttrium salt, followed by one hour aging. 2.22 g of aqueous solution of 50% by weight of ammonium metatungstate (50% by weight as $WO_3$) and 5.55 g of silica sol (SNOWTEX O manufactured by Nissan Kagaku K.K., 20% by weight as silica) were added to the resulting slurry. The resulting mixture was evaporated to dryness while it was stirred, and dried at a temperature of 120° C. for 24 hours, followed by calcining at a temperature of 500° C. for three hours in the air, thereby 10 g of a powder of zirconium/silicon/yttrium/tungsten composite oxide (having an oxide basis weight ratio of 70/10/10/10 and a specific surface area of 114 $m^2/g$) was obtained.

5 g of the powder of the composite oxide was added to 20 mL of ion exchanged water to prepare a slurry. 5 g of aqueous solution of rhodium nitrate (0.1% by weight as Rh) was added to the slurry while the slurry was stirred with a magnetic stirrer. The resultant was kept at a temperature of 60° C. for one hour to support rhodium ions on the composite oxide by ion exchange. The resulting slurry was evaporated to dryness while it was stirred, followed by calcining at a temperature of 500° C. for one hour in the air, thereby a catalyst powder of zirconium/silicon/yttrium/tungsten composite oxide supporting 0.1% by weight of rhodium was obtained.

Using this catalyst powder, a honeycomb catalyst structure A14 supporting 150 g of catalyst per 1 L of honeycomb substrate was obtained in the same manner as Example 1.

Example 15

19.52 g of zirconyl nitrate ($ZrO(NO_3)_3.2H_2O$) and 1.90 g of niobium chloride ($NbCl_5$) were dissolved in 100 mL of ion exchanged water to prepare an aqueous solution. 0.1 N ammonia water was added to the aqueous solution to neutralize and hydrolyze the zirconium salt and niobium salt, followed by one hour aging. The product was separated by filtration from the resulting slurry, dried at a temperature of 120° C. for 24 hours, followed by calcining at a temperature of 500° C. for three hours in the air, thereby 10 g of a powder of zirconium/niobium composite oxide (having an oxide basis weight ratio of 90/10 and a specific surface area of 112 $m^2/g$) was obtained.

5 g of the powder of the composite oxide was added to 20 mL of ion exchanged water to prepare a slurry. 5 g of aqueous solution of rhodium nitrate (0.1% by weight as Rh) was added to the slurry while the slurry was stirred with a magnetic stirrer. The resultant was kept at a temperature of 60° C. for one hour to support rhodium ions on the composite oxide by ion exchange. The resulting slurry was evaporated to dryness while it was stirred, followed by calcining at a temperature of 500° C. for one hour in the air, thereby a catalyst powder of zirconium/niobium composite oxide supporting 0.1% by weight of rhodium was obtained.

Using this catalyst powder, a honeycomb catalyst structure A15 supporting 150 g of catalyst per 1 L of honeycomb substrate was obtained in the same manner as Example 1.

Example 16

17.35 g of zirconyl nitrate ($ZrO(NO_3)_3.2H_2O$) and 5.10 g of praseodymium nitrate ($Pr(NO_3)_3.6H_2O$) were dissolved in 100 mL of ion exchanged water to prepare an aqueous solution. 0.1 N ammonia water was added to the aqueous solution to neutralize and hydrolyze the zirconium salt and the praseodymium salt, followed by one hour aging. The product was separated by filtration from the resulting slurry, dried at a temperature of 120° C. for 24 hours, followed by calcining at a temperature of 500° C. for three hours in the air, thereby 10 g of a powder of zirconium/praseodymium composite oxide (having an oxide basis weight ratio of 80/20 and a specific surface area of 73 $m^2/g$) was obtained.

5 g of the powder of the zirconium/praseodymium composite oxide was added to 20 mL of ion exchanged water to prepare a slurry. 5 g of aqueous solution of palladium nitrate (0.1% by weight as Pd) and 5 g of aqueous solution of dinitrodiammineplatinum (0.1% by weight as Pt) were added to the slurry while the slurry was stirred with a magnetic stirrer. The resultant was kept at a temperature of 60° C. for one hour to support palladium ions and platinum ions on the composite oxide by ion exchange. The resulting slurry was evaporated to dryness while it was stirred, followed by calcining at a temperature of 500° C. for one hour in the air, thereby a catalyst powder of zirconium/praseodymium composite oxide supporting 0.1% by weight of palladium and 0.1% by weight of platinum was obtained.

Using this catalyst powder, a honeycomb catalyst structure A16 supporting 150 g of catalyst per 1 L of honeycomb substrate was obtained in the same manner as Example 1.

Example 17

18.44 g of zirconyl nitrate ($ZrO(NO_3)_3.2H_2O$) and 3.83 g of praseodymium nitrate ($Pr(NO_3)_3.6H_2O$) were dissolved in 100 mL of ion exchanged water to prepare an aqueous solution. 0.1 N ammonia water was added to the aqueous solution to neutralize and hydrolyze the zirconium salt and the praseodymium salt, followed by one hour aging. The product was separated by filtration from the resulting slurry, dried at a temperature of 120° C. for 24 hours, followed by calcining at a temperature of 500° C. for three hours in the air, thereby 10 g of a powder of zirconium/praseodymium composite oxide (having an oxide basis weight ratio of 85/15 and a specific surface area of 64 $m^2/g$) was obtained.

5 g of the powder of the zirconium/praseodymium composite oxide was added to 20 mL of ion exchanged water to prepare a slurry. 5 g of aqueous solution of palladium nitrate (0.1% by weight as Pd) and 5 g of aqueous solution of dinitrodiammineplatinum (0.1% by weight as Pt) were added to the slurry while the slurry was stirred with a magnetic stirrer. The resultant was kept at a temperature of 60° C. for one hour to support palladium ions and platinum ions on the composite oxide by ion exchange. The resulting slurry was evaporated to dryness while it was stirred, followed by calcining at a temperature of 500° C. for one hour in the air, thereby a catalyst powder of zirconium/praseodymium composite oxide supporting 0.1% by weight of palladium and 0.1% by weight of platinum was obtained.

Using this catalyst powder, a honeycomb catalyst structure A17 supporting 150 g of catalyst per 1 L of honeycomb substrate was obtained in the same manner as Example 1.

Example 18

20.60 g of zirconyl nitrate ($ZrO(NO_3)_3.2H_2O$) and 1.28 g of praseodymium nitrate ($Pr(NO_3)_3.6H_2O$) were dissolved in 100 mL of ion exchanged water to prepare an aqueous solution. 0.1 N ammonia water was added to the aqueous solution to neutralize and hydrolyze the zirconium salt and the praseodymium salt, followed by one hour aging. The product was separated by filtration from the resulting slurry, dried at a temperature of 120° C. for 24 hours, followed by calcining at a temperature of 500° C. for three hours in the air, thereby 10 g of a powder of zirconium/praseodymium composite oxide (having an oxide basis weight ratio of 95/5 and a specific surface area of 56 $m^2/g$) was obtained.

5 g of the powder of the zirconium/praseodymium composite oxide was added to 20 mL of ion exchanged water to prepare a slurry. 5 g of aqueous solution of palladium nitrate (0.1% by weight as Pd) and 5 g of aqueous solution of dinitrodiammineplatinum (0.1% by weight as Pt) were added to the slurry while the slurry was stirred with a magnetic stirrer. The resultant was kept at a temperature of 60° C. for one hour to support palladium ions and platinum ions on the composite oxide by ion exchange. The resulting slurry was evaporated to dryness while it was stirred, followed by calcining at a temperature of 500° C. for one hour in the air, thereby a catalyst powder of zirconium/praseodymium composite oxide supporting 0.1% by weight of palladium and 0.1% by weight of platinum was obtained.

Using this catalyst powder, a honeycomb catalyst structure A18 supporting 150 g of catalyst per 1 L of honeycomb substrate was obtained in the same manner as Example 1.

Comparative Example 1

5 g of H-β zeolite well known as a solid acid catalyst (manufactured by Süd Chemie Catalyst, having a $SiO_2/Al_2O_3$ molar ratio of 25 and a specific surface area of 680 $m^2/g$) were added to 20 mL of ion exchanged water to prepare a slurry. 5.0 g of aqueous solution of rhodium nitrate (0.1% by weight as Rh) was added to the slurry while it was stirred with a magnetic stirrer. The resulting was held at a temperature of 60° C. for one hour to substitute the rhodium ions for the hydrogen ions of the H-β zeolite. The resulting product was dried at a temperature of 100° C., and then calcined at a temperature of 500° C. for one hour in the air, thereby a catalyst powder of H-β zeolite supporting 0.1% by weight of rhodium was obtained.

Using this catalyst powder, a honeycomb catalyst structure B1 supporting 150 g of catalyst per 1 L of honeycomb substrate was obtained in the same manner as Example 1.

Comparative Example 2

21.69 g of zirconyl nitrate ($ZrO(NO_3)_3.2H_2O$) was dissolved in 100 mL of ion exchanged water to prepare an aqueous solution. 0.1 N ammonia water was added to the aqueous solution to neutralize and hydrolyze the zirconium salt, followed by one hour aging. The product was separated by filtration from the resulting slurry, dried at a temperature of 120° C. for 24 hours, followed by calcining at a temperature of 500° C. for three hours in the air, thereby 10 g of a powder of zirconium oxide (having a specific surface area of 58 m$^2$/g).

5 g of the powder of the oxide was added to 20 mL of ion exchanged water to prepare a slurry. 5 g of aqueous solution of rhodium nitrate (0.1% by weight as Rh) was added to the slurry while the slurry was stirred with a magnetic stirrer. The resultant was kept at a temperature of 60° C. for one hour to support rhodium ions on the oxide by ion exchange. The resulting slurry was evaporated to dryness while it was stirred, followed by calcining at a temperature of 500° C. for one hour in the air, thereby a catalyst powder of zirconium oxide supporting 0.1% by weight of rhodium was obtained.

Using this catalyst powder, a honeycomb catalyst structure B2 supporting 150 g of catalyst per 1 L of honeycomb substrate was obtained in the same manner as Example 1.

Comparative Example 3

5 g of the powder of the zirconium oxide obtained in Comparative Example 2 was added to 20 mL of ion exchanged water to prepare a slurry. 5 g of aqueous solution of palladium nitrate (0.1% by weight as Pd) and 5 g of aqueous solution of dinitro-diammineplatinum (0.1% by weight as Pt) were added to the slurry while the slurry was stirred with a magnetic stirrer. The resultant was kept at a temperature of 60° C. for one hour to support palladium ions and platinum ions on the oxide by ion exchange. The resulting slurry was evaporated to dryness while it was stirred, followed by calcining at a temperature of 500° C. for one hour in the air, thereby a catalyst powder of zirconium oxide supporting 0.1% by weight of palladium and 0.1% by weight of platinum was obtained.

Using this catalyst powder, a honeycomb catalyst structure B3 supporting 150 g of catalyst per 1 L of honeycomb substrate was obtained in the same manner as Example 1.

Comparative Example 4

13.01 g of zirconyl nitrate (ZrO(NO$_3$)$_3$.2H$_2$O) and 10.20 g of praseodymium nitrate (Pr(NO$_3$)$_3$.6H$_2$O) were dissolved in 100 mL of ion exchanged water to prepare an aqueous solution. 0.1 N ammonia water was added to the aqueous solution to neutralize and hydrolyze the zirconium salt and the praseodymium salt, followed by one hour aging. The product was separated by filtration from the resulting slurry, dried at a temperature of 120° C. for 24 hours, followed by calcining at a temperature of 500° C. for three hours in the air, thereby 10 g of a powder of zirconium/praseodymium composite oxide (having an oxide basis weight ratio of 60/40 and a specific surface area of 65 m$^2$/g) was obtained.

5 g of the powder of the zirconium/praseodymium composite oxide was added to 20 mL of ion exchanged water to prepare a slurry. 5 g of aqueous solution of palladium nitrate (0.1% by weight as Pd) and 5 g of aqueous solution of dinitrodiammineplatinum (0.1% by weight as Pt) were added to the slurry while the slurry was stirred with a magnetic stirrer. The resultant was kept at a temperature of 60° C. for one hour to support palladium ions and platinum ions on the composite oxide by ion exchange. The resulting slurry was evaporated to dryness while it was stirred, followed by calcining at a temperature of 500° C. for one hour in the air, thereby a catalyst powder of zirconium/praseodymium composite oxide supporting 0.1% by weight of palladium and 0.1% by weight of platinum was obtained.

Using this catalyst powder, a honeycomb catalyst structure B4 supporting 150 g of catalyst per 1 L of honeycomb substrate was obtained in the same manner as Example 1.

(2) Removing Test of Nitrogen Oxides, Carbon Monoxide and Propylene

The removing test of nitrogen oxides (NOx), carbon monoxide (CO) and propylene (C$_3$H$_6$) was carried out using each of the catalyst structures A1 to A18, and B1 to B4. The mixed gas having the composition shown below was passed through a catalyst structure at a space velocity of 50000 h$^{-1}$ while the catalyst structure was raised to a temperature from 100° C. to 600° C. at a heating rate of 10° C./minute. The conversion rate (removal ratio) of nitrogen oxides, carbon monoxide and propylene was calculated based on concentration analysis of nitrogen oxides, carbon monoxide and propylene using an FTIR gas analyzer manufactured by Gasmet Technologies. The removing performance of nitrogen oxides, carbon monoxide and propylene was evaluated by a temperature, T$_{50}$, at which the conversion rate of nitrogen oxides, carbon monoxide and propylene was 50%, respectively.

(Mixed Gas Composition)
NO: 500 ppm
O$_2$: 0.5%
CO: 5000 ppm
H$_2$: 1700 ppm
C$_3$H$_6$: 400 ppm (in terms of C1)
CO$_2$: 14%
H$_2$O: 6%

Table 1 shows T$_{50}$ of the catalyst structures A1, and A11 to A15 according to Examples and T$_{50}$ of the catalyst structures B1 and B2 according to Comparative Examples in which the catalyst contained rhodium in an amount of 0.1% by weight as the first catalyst component, among the catalyst structures mentioned above. The second catalyst component of the catalyst structures A1, and A11 to A15 according to Examples was a composite oxide of the oxide (a) and the oxide (b) whereas the second catalyst component of the catalyst structure B1 according to Comparative Example was zeolite, and the second catalyst component of the catalyst structure B2 according to Comparative Example was zirconium oxide.

TABLE 1

| | Catalyst Structure | | | | | | | |
|---|---|---|---|---|---|---|---|---|
| | Example | | | | | | Comparative | |
| T$_{50}$(° C.) | A1 | A11 | A12 | A13 | A14 | A15 | B1 | B2 |
| NOx | 310 | 337 | 322 | 322 | 339 | 328 | 436 | 376 |
| CO | 285 | 314 | 304 | 314 | 320 | 312 | 489 | 361 |
| C$_3$H$_6$ | 358 | 361 | 362 | 363 | 364 | 378 | 478 | 424 |

As clear from the results shown in Table 1, all T$_{50}$ of the catalyst structures of Examples were found to be smaller than the catalyst structures of Comparative Examples.

Table 2 shows T$_{50}$ of the catalyst structures A2 to A4, and A10 according to Examples and T$_{50}$ of the catalyst structure B3 according to Comparative Example in which the first catalyst component in the catalyst was either a combination of palladium and platinum in a total amount of 0.2% by weight, or a combination of palladium and rhodium in a total amount of 0.2% by weight. The second catalyst component of the catalyst structures A2 to A4, and A10 according to Examples was a composite oxide of the oxide (a) and the oxide (b) whereas the second catalyst component of the catalyst structure B3 according to Comparative Example was zirconium oxide.

TABLE 2

| $T_{50}$ (° C.) | Catalyst Structure | | | | |
|---|---|---|---|---|---|
| | Example | | | | Comparative |
| | A2 | A3 | A4 | A10 | B3 |
| NO$x$ | 251 | 422 | 382 | 278 | 481 |
| CO | 285 | 431 | 461 | 307 | 456 |
| $C_3H_6$ | 349 | 437 | 463 | 373 | 497 |

As clear from the results shown in Table 2, any of $T_{50}$ of the catalyst structures of Examples was found to be smaller than $T_{50}$ of the catalyst structure of Comparative Example except the catalyst structure A4. $T_{50}$ of the catalyst structure A4 was found to be smaller in propylene than $T_{50}$ of the catalyst structure of Comparative Example.

Table 3 also shows $T_{50}$ of the catalyst structures in which the first catalyst component in the catalyst was a combination of palladium and platinum in a total amount of 0.1% by weight, and the weight ratio of palladium/platinum was changed from 1/3 to 3/1, that is, $T_{50}$ of the catalyst structures of A5 to A9, among the catalyst structures mentioned above. $T_{50}$ was found to be the smallest when the weight ratio of palladium/platinum was 1/1.

TABLE 3

| $T_{50}$ (° C.) | Catalyst Structure Example | | | | |
|---|---|---|---|---|---|
| | A5 | A6 | A7 | A8 | A9 |
| NO$x$ | 446 | 395 | 331 | 406 | 430 |
| CO | 458 | 407 | 327 | 417 | 465 |
| $C_3H_6$ | 475 | 422 | 373 | 425 | 465 |

Table 4 shows $T_{50}$ of the catalyst structures in which the first catalyst component in the catalyst is 0.1% by weight of palladium and 0.1% by weight of platinum and the second catalyst component in the catalyst is a composite oxide of zirconium/praseodymium and in which the weight ratio of oxide of zirconium/oxide of praseodymium in the composite oxide was changed from 60/40 to 95/5, that is, $T_{50}$ of the catalyst structures of A2, and A16 to A18 according to Examples, and $T_{50}$ of the catalyst structure of B4, among the catalyst structures mentioned above. The catalyst structure A2 was found to have $T_{50}$ remarkably smaller in all the components than the $T_{50}$ of the catalyst structure of B4.

TABLE 4

| $T_{50}$ (° C.) | Catalyst Structure | | | | |
|---|---|---|---|---|---|
| | Comparative | Example | | | |
| | B4 | A16 | A17 | A2 | A18 |
| NO$x$ | 299 | 286 | 264 | 251 | 272 |
| CO | 314 | 312 | 306 | 285 | 312 |
| $C_3H_6$ | 388 | 372 | 357 | 349 | 371 |

As set forth above, the catalyst of the invention removes the three components of NOx, CO and propylene at a temperature lower than the catalysts of Comparative Examples, and hence has a higher three-way catalytic performance.

(3) Ammonia Adsorption and Temperature-Programmed Desorption Test of the First Catalyst Ammonia adsorption and temperature-programmed desorption tests of the catalyst structures A1 to A15 according to Examples and the catalyst structures B1 to B3 according to Comparative Examples were carried out in the following procedures. The results are shown in Table 5.

(a) Pretreatment

About 0.05 g of sample was placed in a measurement cell, and the temperature was raised from room temperature to 500° C. at a rate of 10° C./minute in a stream of helium (50 mL/minute), at which temperature the sample was held for 60 minutes.

(b) Ammonia Adsorption

Ammonia gas was adsorbed at a temperature of 100° C. for 30 minutes on the catalyst which had been pretreated as mentioned above.

(c) Ammonia Degassing

The catalyst on which ammonia was adsorbed was heated at a temperature of 100° C. for 30 minutes in a stream of helium to degas the ammonia.

(e) Steam Treatment

The ammonia-degassed catalyst was steam-treated at a temperature of 100° C. for 60 minutes, and then degassed at a temperature of 100° C. for 60 minutes in a stream of helium.

(f) Measurement of Desorbed Ammonia

The catalyst was raised in temperature from 100° C. to 800° C. at a rate of 10° C./minute in a stream of helium at a rate of 50 mL/minute to measure the amount of ammonia (m/z=16, $NH_2^+$) desorbed from the catalyst using a quadrupole mass spectrometer.

TABLE 5

| | Catalyst Structure Example | | | | | | | | |
|---|---|---|---|---|---|---|---|---|---|
| | A1 | A2 | A3 | A4 | A5 | A6 | A7 | A8 | A9 |
| $NH_3$ desorption temperature (° C.) | 243 | 302 | 255 | 224 | 243 | 243 | 243 | 243 | 243 |
| $NH_3$ desorbed amount (μmol/g) | 18 | 17 | 36 | 82 | 18 | 18 | 18 | 18 | 18 |
| $NH_3$ desorption temperature (° C.) | 660 | 613 | — | — | 660 | 660 | 660 | 660 | 660 |
| $NH_3$ desorbed amount (μmol/g) | 2.8 | 3.6 | — | — | 2.8 | 2.8 | 2.8 | 2.8 | 2.8 |

| | Catalyst Structure | | | | | | | | |
|---|---|---|---|---|---|---|---|---|---|
| | Example | | | | | | Comparative | | |
| | A10 | A11 | A12 | A13 | A14 | A15 | B1 | B2 | B3 |
| $NH_3$ desorption temperature (° C.) | 243 | — | 197 | 173 | — | — | 206 | 195 | 207 |
| $NH_3$ desorbed amount (μmol/g) | 18 | — | 30 | 9.4 | — | — | 58 | 39 | 147 |
| $NH_3$ desorption temperature (° C.) | 660 | 302 | 631 | 346 | 292 | 305 | — | — | — |
| $NH_3$ desorbed amount (μmol/g) | 2.8 | 26 | 13 | 100 | 52 | 70 | — | — | — |

The catalyst of the invention has an ammonia desorption peak at a temperature in a range of 275° C. to 700° C. in the ammonia absorption and temperature-programmed desorption test. Accordingly, a strong solid acid is present in the catalyst of the invention, and hence hydrocarbons combust at a lower temperature.

(II) Production of Catalyst Structure Having the Second Catalyst (Two-Layer Catalyst Structure) and Evaluation of the Catalytic Performance
(1) Production of Catalyst Structure Example 19

(Preparation of Catalyst Powder for Inner Catalyst Layer)
5 g of ceria (HSA20 manufactured by Anan Kasei K.K., having a specific surface area of 160 $m^2/g$) was added to 20 mL of ion exchanged water to prepare a slurry. 5 g of aqueous solution of palladium nitrate (0.5% by weight as Pd) was added to the slurry while the slurry was stirred. The resulting slurry was held at a temperature of 60° C. for one hour to support palladium ions on the ceria by ion exchange, evaporated to dryness with stirring, followed by calcining at a temperature of 500° C. for one hour in the air, thereby a catalyst powder of ceria for an inner catalyst layer supporting 0.5% by weight of palladium was obtained.

(Preparation of Catalyst Powder for Surface Catalyst Layer)
19.52 g of zirconyl nitrate ($ZrO(NO_3)_2.2H_2O$) and 2.55 g of praseodymium nitrate ($Pr(NO_3)_3.6H_2O$) were dissolved in 100 mL of ion exchanged water to prepare an aqueous solution. 0.1 N ammonia water was added to the aqueous solution to neutralize and hydrolyze the zirconium salt and praseodymium salt, followed by one hour aging. The product was separated by filtration from the resulting slurry, dried at a temperature of 120° C. for 24 hours, and calcined at a temperature of 500° C. for three hours in the air, thereby 10 g of a powder of zirconium/praseodymium composite oxide (having an oxide basis weight ratio of 90/10 and a specific surface area of 112 $m^2/g$) was obtained.

5 g of the powder of the composite oxide was added to 20 mL of ion exchanged water to prepare a slurry. 5 g of aqueous solution of rhodium nitrate (0.1% by weight of Rh) was added to the slurry while the slurry was stirred with a magnetic stirrer. The resultant was kept at a temperature of 60° C. for one hour to support rhodium ions on the composite oxide by ion exchange. The resulting slurry was evaporated to dryness while it was stirred, followed by calcining at a temperature of 500° C. for one hour in the air, thereby a catalyst powder of zirconium/praseodymium composite oxide for a surface catalyst layer supporting 0.1% by weight of rhodium was obtained.

(Production of Catalyst Structure)
3 g of the catalyst powder for an inner catalyst layer, 0.6 g of alumina sol and 0.8 g of silica sol were mixed with a proper amount of water. The mixture was shaken by hand in the presence of several grams of zirconia balls as grinding media to disintegrate the aggregated mixture, thereby a slurry for wash coating was obtained. The slurry for wash coating was coated on a honeycomb formed of cordierite having a cell number of 400 per square inch, dried, and calcined at a temperature of 500° C. for one hour in the air so that the catalyst powder was supported on the honeycomb substrate in an amount of 75 g per 1 L of the honeycomb substrate. An inner catalyst layer was formed on the honeycomb substrate in this way.

Then, in the same manner as the inner catalyst layer was formed on the honeycomb substrate, the catalyst powder for a surface catalyst layer was supported on the inner catalyst layer in an amount of 75 g per 1 L of the honeycomb substrate, thereby a two-layer honeycomb catalyst structure C1 having the inner catalyst layer and the surface catalyst layer was obtained.

Example 20

(Preparation of Catalyst Powder for Inner Catalyst Layer)
103.77 g of cerium nitrates ($Ce(NO_3)_3.6H_2O$) and 35.77 g of praseodymium nitrate ($Pr(NO_3)_3.6H_2O$) were dissolved in 100 mL of ion exchanged water to prepare an aqueous solution. 0.1 N ammonia water was added to the aqueous solution to neutralize and hydrolyze the cerium salt and the praseodymium salt, followed by aging for one hour. The product was separated by filtration from the resulting slurry, dried at a temperature of 120° C. for 24 hours, followed by calcining at a temperature of 500° C. for three hours in the air, thereby a powder of cerium/praseodymium composite oxide (having an oxide basis weight ratio of 60/40 and a specific surface area of 112 $m^2/g$) was obtained.

5 g of the powder of cerium/praseodymium composite oxide thus obtained was added to 20 mL of ion exchanged water to prepare a slurry. 5 g of aqueous solution of palladium nitrate (0.25% by weight as Pd) and 5 g of aqueous solution of dinitrodiammine-platinum (0.25% by weight as Pt) were added to the slurry while the slurry was stirred with a magnetic stirrer. The resultant was kept at a temperature of 60° C. for one hour to support the palladium ions and the platinum ions on the composite oxide by ion exchange. The resulting slurry was evaporated to dryness while it was stirred, followed by calcining at a temperature of 500° C. for one hour in the air, thereby a catalyst powder of cerium/praseodymium composite oxide for an inner catalyst layer supporting 0.25% by weight of palladium and 0.25% by weight of platinum was obtained.

(Preparation of Catalyst Powder for Surface Catalyst Layer)
19.52 g of zirconyl nitrate ($ZrO(NO_3)_2.2H_2O$) and 7.36 g of aluminum nitrate ($Al(NO_3)_3.9H_2O$) were dissolved in 100 mL of ion exchanged water to prepare an aqueous solution. 0.1 N ammonia water was added to the aqueous solution to neutralize and hydrolyze the zirconium salt and aluminum salt, followed by one hour aging. The product was separated by filtration from the resulting slurry, dried at a temperature of 120° C. for 24 hours, and calcined at a temperature of 500° C. for three hours in the air, thereby 10 g of a powder of zirconium/aluminum composite oxide (having an oxide basis weight ratio of 90/10 and a specific surface area of 233 $m^2/g$) was obtained.

5 g of the powder of composite oxide was added to 20 mL of ion exchanged water to prepare a slurry. 5 g of aqueous solution of rhodium nitrate (0.1% by weight as Rh) was added to the slurry while the slurry was stirred with a magnetic stirrer. The resultant was kept at a temperature of 60° C. for one hour to support rhodium ions on the composite oxide by ion exchange. The resulting slurry was evaporated to dryness while it was stirred, followed by calcining at a temperature of 500° C. for one hour in the air, thereby a catalyst powder of zirconium/aluminum composite oxide for a surface catalyst layer supporting 0.1% by weight of rhodium was obtained.

(Production of Catalyst Structure)
3 g of the catalyst powder for an inner catalyst layer, 0.6 g of alumina sol and 0.8 g of silica sol were mixed with a proper amount of water. The mixture was shaken by hand in the presence of several grams of zirconia balls as grinding media to disintegrate the aggregated mixture, thereby a slurry for wash coating was obtained. The slurry for wash coating was coated on a honeycomb formed of cordierite having a cell number of 400 per square inch, dried, and calcined at a temperature of 500° C. for one hour in the air so that the catalyst powder was supported on the honeycomb substrate in an amount of 75 g per 1 L of the honeycomb substrate. Thus, an inner catalyst layer was formed on the honeycomb substrate.

Then, in the same manner as the inner catalyst layer was formed on the honeycomb substrate, the catalyst powder for the surface catalyst layer was supported on the inner catalyst layer in an amount of 75 g per 1 L of the honeycomb substrate, thereby a two-layer honeycomb catalyst structure C2 having the inner catalyst layer and the surface catalyst layer was obtained.

Example 21

(Preparation of Catalyst Powder for Inner Catalyst Layer)

77.83 g of cerium nitrates ($Ce(NO_3)_3.6H_2O$), 36.03 g of oxyzirconium nitrate ($ZrO(NO_3)_2$) and 35.26 g of praseodymium nitrate ($Pr(NO_3)_3.6H_2O$) were dissolved in 1700 mL of ion exchanged water to prepare an aqueous solution. 0.1 N ammonia water was added to the aqueous solution to neutralize and hydrolyze the cerium salt, zirconium salt and the praseodymium salt, followed by aging for one hour. The product was separated by filtration from the resulting slurry, dried at a temperature of 120° C. for 24 hours, followed by calcining at a temperature of 500° C. for three hours in the air, thereby a powder of cerium/zirconium/praseodymium composite oxide (having an oxide basis weight ratio of 47/33/22 and a specific surface area of 205 $m^2/g$) was obtained.

5 g of the powder of cerium/zirconium/praseodymium composite oxide thus obtained was added to 20 mL of ion exchanged water to prepare a slurry. 5 g of aqueous solution of palladium nitrate (0.25% by weight as Pd) and 5 g of aqueous solution of rhodium nitrate (0.1% by weight as Rh) were added to the slurry while the slurry was stirred with a magnetic stirrer. The resultant was kept at a temperature of 60° C. for one hour to support the palladium ions and the rhodium ions on the composite oxide by ion exchange. The resulting slurry was evaporated to dryness while it was stirred, followed by calcining at a temperature of 500° C. for one hour in the air, thereby a catalyst powder of cerium/zirconium/-praseodymium composite oxide for an inner catalyst layer supporting 0.25% by weight of palladium and 0.1% by weight of rhodium was obtained.

(Preparation of Catalyst Powder for Surface Catalyst Layer)

24.40 g of zirconyl nitrate ($ZrO(NO_3)_3.2H_2O$) was dissolved in 100 mL of ion exchanged water to prepare an aqueous solution. 0.1 N ammonia water was added to the aqueous solution to neutralize and hydrolyze the zirconium salt, followed by one hour aging. The product was separated by filtration from the resulting slurry, dried at a temperature of 120° C. for 24 hours, and calcined at a temperature of 500° C. for three hours in the air, thereby 10 g of a powder of zirconium oxide was obtained.

10 mL of ion exchanged water was added to the powder of the oxide, and then 2.22 g of aqueous solution of 50% by weight ammonium metatungstate was added thereto. The resulting slurry was evaporated to dryness while it was stirred, followed by calcining at a temperature of 500° C. for three hours in the air, thereby 11 g of a powder of zirconium/tungsten composite oxide (having an oxide basis weight ratio of 90/10 and a specific surface area of 93 $m^2/g$) was obtained.

5 g of the powder of the composite oxide was added to 20 mL of ion exchanged water to prepare a slurry. 5 g of aqueous solution of palladium nitrate (0.1% by weight as Pd) and 5 g of aqueous solution of dinitrodiammineplatinum (0.1% by weight of Pt) were added to the slurry while the slurry was stirred with a magnetic stirrer. The resultant was kept at a temperature of 60° C. for one hour to support the palladium ions and the dinitrodiammineplatinum ions on the composite oxide by ion exchange. The resulting slurry was evaporated to dryness while it was stirred, followed by calcining at a temperature of 500° C. for one hour in the air, thereby a catalyst powder of zirconium/tungsten composite oxide for a surface catalyst layer supporting 0.1% by weight of palladium and 0.1% by weight of platinum was obtained.

(Production of Catalyst Structure)

3 g of the catalyst powder for an inner catalyst layer, 0.6 g of alumina sol and 0.8 g of silica sol were mixed with a proper amount of water. The mixture was shaken by hand in the presence of several grams of zirconia balls as grinding media to disintegrate the aggregated mixture, thereby a slurry for wash coating was obtained. The slurry for wash coating was coated on a honeycomb formed of cordierite having a cell number of 400 per square inch, dried, and calcined at a temperature of 500° C. for one hour in the air so that the catalyst powder was supported on the honeycomb substrate in an amount of 50 g per 1 L of the honeycomb substrate. Thus, an inner catalyst layer was formed on the honeycomb substrate.

Then, in the same manner as the inner catalyst layer was formed on the honeycomb substrate, the catalyst powder for the surface catalyst layer was supported on the inner catalyst layer in an amount of 75 g per 1 L of the honeycomb substrate, thereby a two-layer honeycomb catalyst structure C3 having the inner catalyst layer and the surface catalyst layer was obtained.

Example 22

(Preparation of Catalyst Powder for Inner Catalyst Layer)

34.59 g of cerium nitrates ($Ce(NO_3)_3.6H_2O$), 84.45 g of oxyzirconium nitrate ($ZrO(NO_3)_2$) and 7.97 g of lanthanum nitrate ($La(NO_3)_3.6H_2O$) were dissolved in 1700 mL of ion exchanged water to prepare an aqueous solution. 0.1 N ammonia water was added to the aqueous solution to neutralize and hydrolyze the cerium salt, zirconium salt and the lanthanum salt, followed by aging for one hour. The product was separated by filtration from the resulting slurry, dried at a temperature of 120° C. for 24 hours, followed by calcining at a temperature of 500° C. for three hours in the air, thereby a powder of cerium/zirconium/lanthanum composite oxide (having an oxide basis weight ratio of 22/73/5 and a specific surface area of 80 $m^2/g$) was obtained.

5 g of aqueous solution of palladium nitrate (0.25% by weight as Pd) was added to 100 mL of ion exchanged water to prepare an aqueous solution. Then 5 g of the powder of cerium/zirconium/-lanthanum composite oxide was added to the aqueous solution. The resultant slurry was dried at a temperature of 100° C. with stirring, followed by calcining at a temperature of 500° C. for three hours in the air, thereby a catalyst powder of cerium/zirconium/lanthanum composite oxide for an inner catalyst layer supporting 0.25% by weight of palladium was obtained.

(Preparation of Catalyst Powder for Surface Catalyst Layer)

60 g of aqueous solution of titanium tetrachloride (15% by weight as titanium oxide) and 5 g of silica sol (SNOWTEX O manufactured by Nissan Kagaku K.K., 20% by weight as silica) were mixed while stirring. 0.1 N ammonia water was added to the mixture to neutralize and hydrolyze the mixture, followed by aging for one hour. The product was separated by filtration from the obtained slurry, and dried at a temperature of 120° C. for 24 hours, followed by calcining at a temperature of 500° C. for three hours in the air, thereby 10 g of a powder of titanium/silicon composite oxide (having an oxide basis weight ratio of 90/10 and a specific surface area of 186 m²/g) was obtained.

5 g of the powder of the composite oxide was added to 20 mL of ion exchanged water to prepare a slurry. 5 g of aqueous solution of rhodium nitrate (0.1% by weight as Rh) was added to the slurry while the slurry was stirred with a magnetic stirrer. The resultant was kept at a temperature of 60° C. for one hour to support rhodium ions on the composite oxide by ion exchange. The resulting slurry was evaporated to dryness while it was stirred, followed by calcining at a temperature of 500° C. for one hour in the air, thereby a catalyst powder of titanium/silicon composite oxide for a surface catalyst layer supporting 0.1% by weight of rhodium was obtained.

(Production of Catalyst Structure)

3 g of the catalyst powder for an inner catalyst layer, 0.6 g of alumina sol and 0.8 g of silica sol were mixed with a proper amount of water. The mixture was shaken by hand in the presence of several grams of zirconia balls as grinding media to disintegrate the aggregated mixture, thereby a slurry for wash coating was obtained. The slurry for wash coating was coated on a honeycomb formed of cordierite having a cell number of 400 per square inch, dried, and calcined at a temperature of 500° C. for one hour in the air so that the catalyst powder for an inner catalyst layer was supported on the honeycomb substrate in an amount of 50 g per 1 L of the honeycomb substrate, thereby an inner catalyst layer was formed on the honeycomb substrate.

Then, in the same manner as the inner catalyst layer was formed on the honeycomb substrate, the catalyst powder for a surface catalyst layer was supported on the inner catalyst layer in an amount of 75 g per 1 L of the honeycomb substrate, thereby a two-layer honeycomb catalyst structure C4 having the inner catalyst layer and the surface catalyst layer was obtained.

(2) Removing Test of Nitrogen Oxides, Carbon Monoxide and Propylene

In the same manner as the catalyst structure having a monolayer catalyst structure comprising the first catalyst, a removing test of nitrogen oxides (NOx), carbon monoxide (CO), and propylene ($C_3H_6$) was carried out using the catalyst structures C1 to C4. The results are shown in Table 6.

TABLE 6

| $T_{50}$ (° C.) | Catalyst Structure Example | | | |
|---|---|---|---|---|
| | C1 | C2 | C3 | C4 |
| NOx | 280 | 291 | 274 | 282 |
| CO | 255 | 263 | 275 | 277 |
| $C_3H_6$ | 343 | 338 | 336 | 351 |

As clear from the results shown in Table 6, any of the two-layer catalyst structures has small $T_{50}$ in any of the three components.

The invention claimed is:

1. A catalyst for catalytically removing three components which are carbon monoxide, hydrocarbons and nitrogen oxides from combustion exhaust gas generated by combusting at around a stoichiometric air to fuel ratio by bringing the combustion exhaust gas into contact therewith, the catalyst consisting essentially of:
   (A) a first catalyst component comprising at least one member selected from the group consisting of rhodium, platinum, and palladium, in a content from 0.01 to 0.5% by weight; and
   (B) a second catalyst component, which is a remainder of the catalyst, consisting of a composite oxide or a mixed oxide consisting of:
      (a) at least one oxide selected from the group consisting of zirconium oxide and titanium oxide; and
      (b) an oxide of at least one element selected from the group consisting of praseodymium, yttrium, neodymium, tungsten, niobium, silicon, and aluminum,
      wherein a content of the oxide (a) in the composite oxide or the mixed oxide is in a range from 70 to 95% by weight, and
   wherein the first catalyst component is supported by the second catalyst component.

2. The catalyst according to claim 1, wherein the second catalyst component is a composite oxide consisting of zirconium oxide and praseodymium oxide, and a content of the zirconium oxide in the composite oxide is in a range from 85 to 95% by weight.

3. The catalyst according to claim 1, wherein the first catalyst component comprises rhodium.

4. The catalyst according to claim 1, wherein the first catalyst component comprises a combination of platinum and palladium.

5. The catalyst according to claim 1, wherein the first catalyst component comprises a combination of platinum and palladium wherein a weight ratio of platinum/palladium is in a range from 1/3 to 3/1.

6. The catalyst according to claim 1, wherein the first catalyst component comprises a combination of platinum and palladium wherein a weight ratio of platinum/palladium is in a range from 1/2 to 2/1.

7. The catalyst according to claim h wherein the first catalyst component comprises a combination of platinum and palladium wherein a weight ratio of platinum/palladium is in a range from 2/3 to 3/2.

8. The catalyst according to claim 1, which has an ammonia desorption peak at a temperature in a range from 275 to 700° C. in an ammonia adsorption and temperature-programmed desorption test.

9. A two-layer catalyst for catalytically removing three components, which are carbon monoxide, hydrocarbons, and nitrogen oxides from combustion exhaust gas generated by combusting fuel at around a stoichiometric air to fuel ratio by bringing the combustion exhaust gas into contact therewith, the catalyst consisting essentially of:
   a surface catalyst layer; and
   an inner catalyst layer,
   wherein the surface catalyst layer consists essentially of:
   (A) a first catalyst component comprising at least one member selected from the group consisting of rhodium, platinum, and palladium in a content from 0.01 to 0.5% by weight; and
   (B) a second catalyst component, which is a remainder of the surface catalyst layer, consisting of a composite oxide or a mixed oxide that consists of:
      (a) at least one oxide selected from the group consisting of zirconium oxide and titanium oxide; and
      (b) an oxide of at least one element selected from the group consisting of praseodymium, yttrium, neodymium, tungsten, niobium, silicon, and aluminum,
      wherein a content of the oxide (a) in the composite oxide or the mixed oxide is in a range from 70 to 95% by weight, and
   wherein the first catalyst component is supported by the second catalyst component; and
   wherein the inner catalyst layer comprises:

(A) a first catalyst component comprising at least one member selected from the group consisting of rhodium, platinum, and palladium in a content from 0.01 to 0.5 % by weight; and (B) a second catalyst component, which is a remainder of the inner catalyst layer, comprising
   (a) ceria, or
   (b) a composite oxide or a mixed oxide comprising:
      (i) ceria; and
      (ii) an oxide of at least one element selected from the group consisting of zirconium, lanthanum, praseodymium, neodymium, and yttrium,
      wherein a content of the oxide (i) in the composite oxide or mixed oxide is in a range from 50 to 95% by weight.

10. The two-layer catalyst according to claim 9, wherein the second catalyst component in the inner catalyst layer comprises ceria, or a composite oxide comprising ceria and at least one element selected from the group consisting of zirconium, lanthanum, and praseodymium.

11. The two-layer catalyst according to claim 9, wherein the first catalyst component in the surface catalyst layer comprises rhodium.

12. The two-layer catalyst according to claim 9, wherein the first catalyst component in the surface catalyst layer comprises a combination of platinum and palladium.

13. The two-layer catalyst according to claim 9, wherein the first catalyst component in the inner catalyst layer comprises palladium, or a combination of palladium and at least one element selected from the group consisting of platinum and rhodium.

14. The two-layer catalyst according to the claim 9, wherein the first catalyst component comprises a combination of platinum and palladium, wherein a weight ratio of platinum/palladium is in a range from 1/3 to 3/1.

15. The two-layer catalyst according to claim 9, wherein the first catalyst component comprises a combination of platinum and palladium, wherein a weight ration of platinum/palladium is in a range from 1/2 to 2/1.

16. The two-layer catalyst according to claim 9, wherein the first catalyst component comprises a combination of platinum and palladium, wherein a weight ratio of platinum/palladium is in a range from 2/3 to 3/2.

* * * * *

UNITED STATES PATENT AND TRADEMARK OFFICE
CERTIFICATE OF CORRECTION

| | | |
|---|---|---|
| PATENT NO. | : 8,673,809 B2 | Page 1 of 1 |
| APPLICATION NO. | : 13/050702 | |
| DATED | : March 18, 2014 | |
| INVENTOR(S) | : Nakatsuji et al. | |

It is certified that error appears in the above-identified patent and that said Letters Patent is hereby corrected as shown below:

Title page, item (73) Assignee:   two assignees should be listed.

Honda Motor Co., Ltd., Tokyo (JP)
Tadao Nakatsuji, Nara (JP)

Signed and Sealed this
Eighteenth Day of November, 2014

Michelle K. Lee
*Deputy Director of the United States Patent and Trademark Office*